G. D. HARRIS.
APPARATUS FOR DEHYDRATING FOOD PRODUCTS.
APPLICATION FILED MAY 24, 1907.

959,933.

Patented May 31, 1910.
3 SHEETS—SHEET 1.

WITNESSES

INVENTOR
Gordon Don Harris
BY
ATTORNEYS

UNITED STATES PATENT OFFICE.

GORDON DON HARRIS, OF BAY SHORE, NEW YORK, ASSIGNOR OF ONE-HALF TO ALBERT R. BRANDLY, OF NEW YORK, N. Y.

APPARATUS FOR DEHYDRATING FOOD PRODUCTS.

959,933.  Specification of Letters Patent.  Patented May 31, 1910.

Application filed May 24, 1907. Serial No. 375,528.

*To all whom it may concern:*

Be it known that I, GORDON DON HARRIS, a citizen of the United States, residing at Bay Shore, in the county of Suffolk and State of New York, have invented a certain new and useful Apparatus for Dehydrating Food Products, of which the following is a specification.

This invention comprises an apparatus and process for treating liquid or semi-liquid food products, and other substances, for the purpose of eliminating the water therefrom, and producing dry products, possessing substantially all the characteristics of the original materials, except that they lack their original water content.

The invention is particularly applicable, however, to the treatment of milk, eggs, and similar liquid bearing food substances, with a view to producing dry, sterile products therefrom, without substantially altering the chemical character of the solid constituents in said substances.

The dehydrated products may be kept indefinitely and, when desired to be used, may be changed to substantially their original condition by merely mixing them with water.

With the foregoing objects in view, I subject the material, which it is desired to dehydrate, while in the form of a film, to the action of air which has been previously treated to thoroughly dry (dehydrate) and sterilize the same, whereby said air quickly absorbs the moisture therefrom, leaving the material in a dehydrated condition. Specifically, I pass a web of cloth, or wire mesh, (depending on the material under treatment), in the form of a continuous apron, through said material, whereby said web becomes saturated with the material, and then subject the web to the action of the dehydrated air. The material is quickly deprived of its moisture and remains on the web in the form of a film or powder from which it may be removed, in the form of a dry impalpable powder, by beating or whipping the web.

My process is not a drying one in the sense in which the term drying is commonly used, since it is not dependent on the temperature of the air to effect the dehydration of the material; but, on the contrary, I employ a large volume of air, at comparatively low temperature, which air has been completely dehydrated, whereby said air acts merely, to absorb, rather than drive off by evaporation, the water contained in the products being operated upon.

In the accompanying drawings, I have illustrated one practical embodiment of the invention, but the construction shown therein is to be understood as illustrative only, and not as defining the limits of the invention.

Figures 1, 8:
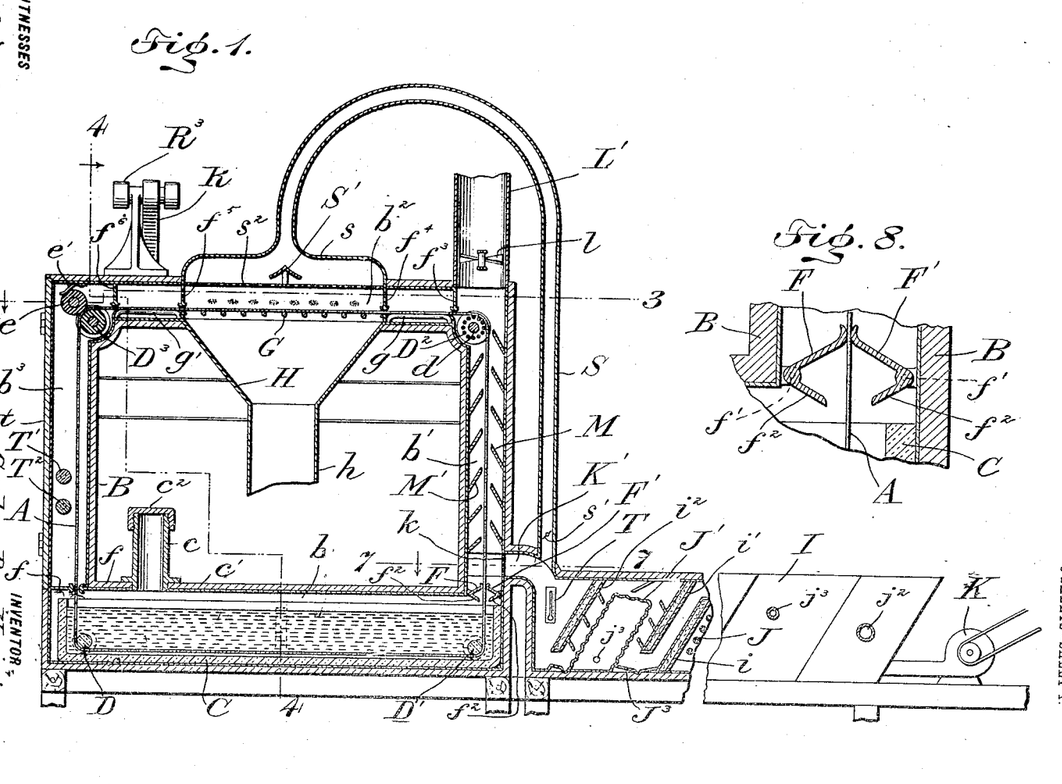
Figure 1 is a vertical section, partly in elevation, of an apparatus adapted to carry into practice my process of dehydrating food products, the plane of the section being indicated by the irregular dotted line 1—1 of Fig. 3.
Fig. 8 is a detail view showing on an enlarged scale a pair of wipers adapted to remove the surplus material from an endless carrier and to secure a substantially air tight connection between the supply tank and a treating chamber of the apparatus.

In one form of apparatus contemplated by this invention I employ a substantially endless carrier, A, which is adapted to travel into and through a series of chambers or compartments which are provided in a casing, B. A preferred form of this casing, B, is shown in Fig. 1, wherein said casing is shown as having chambers, $b$, $b'$, $b^2$, $b^3$. It is to be understood, however, that any appropriate form of casing may be employed, and that the several chambers may be arranged in different positions than in the apparatus shown in said Fig. 1. As shown, the casing, B, is substantially rectangular, and the several chambers, $b$, $b'$, $b^2$, $b^3$, are at the respective sides of the rectangle so as to form a substantially continuous inclosure for the several leads of the endless traveling carrier, A.

The material to be treated is adapted to be contained in a tank, C, which is located in a substantially closed chamber, $b$, of the casing. Said tank is composed, preferably, of glass in order that it may be readily cleaned and maintained in a good sanitary condition. As shown, the tank is open at its upper side in order that the supply of material may be replenished conveniently through a charging pipe, $c$, the latter being secured to the top, $c'$, of the chamber, $b$, and adapted to convey the liquid, or semi-liquid material directly into said tank, C. The filling pipe, $c$, is shown as having a cap, $c^2$, screwed thereon, but it is evident that this pipe may be extended so as to lead to a suitable source of supply, such for example as a pump, whereby the material to be treated may be fed conveniently to the tank, C. The end portions of the tank, C, are below the treating chamber, $b'$, and the return chamber, $b^3$, respectively, and two leads of said endless carrier, A, are adapted to extend into said tank, C. The ingoing lead of the carrier passes from the chamber, $b^3$, into the chamber, $b$, and thence downwardly into an end portion of the tank, C, whereby said lead of the carrier fits beneath a guide roller, D. From this roller the carrier, A, extends horizontally along and close to the bottom of the tank, C, and thence passes around another guide roller, $D'$, which is located below the treating or desiccating chamber, $b'$. It is preferred to make the rollers, D, $D'$, of glass, although it is evident that the tank, C, and the guide rollers therein may be composed of any other appropriate material adapted to be readily cleansed.

An outgoing lead of the endless carrier, A, passes upwardly from the tank, C, into and through the treating chamber, $b'$; said outgoing lead passing over a guide element, $D^2$, which is located at or about the point where the upper part of the desiccating chamber, $b'$, communicates with the right hand end portion of the chamber, $b^2$. The guide element, $D^2$, is represented as a skeletonized roller over which the carrier, A, is adapted to travel with a minimum amount of friction between the surfaces of the roller and the carrier. It is preferred to employ a guide roller composed of a series of rods secured to suitable heads and mounted on the horizontal shaft, $d$, one end of said shaft extending beyond the casing, B, and provided with a pulley, $d'$, see Fig. 3. The endless carrier passes horizontally through the chamber, $b^2$, and thence downwardly into the return chamber, $b^3$, said carrier passing over a driving roller, $D^3$. Said roller is carried by a shaft, $d^2$, which extends horizontally through the casing, and on this shaft is a series of pulleys, $d^3$, $d^4$, $d^5$. The pulley, $d^3$, is in line with the pulley, $d'$, of the shaft, $d$, of the skeletonized guide member, $D^2$, and said pulleys, $d'$, $d^3$, are connected operatively by a belt, $D^4$, whereby the guide member, $D^2$, is driven at the same speed as the driving pulley, $D^3$, and the endless carrier, A. The carrier as it passes over the driving roller, $D^3$, is engaged by a friction roller, $e$, which coöperates with the roller, $D^3$, so that the endless carrier is gripped frictionally between the rollers, $D^3$, $e$, for the purpose of driving said carrier at the desired speed. The pressure roller, $e$, is on a shaft, $e^2$, which is geared at $e^3$ with the shaft, $d^2$, of the driving roller, $D^3$, see Fig. 3. Air is prevented from passing from the chamber, $b^2$, into the chamber, $b^3$, by a plate, $f^6$, and a spring plate $e'$, the latter pressing on the roller, $e$, see Fig. 1. Communication between the chamber, $b$, and the chamber, $b^3$, is cut off by the employment of one or more cut off plates, $f$, two of said plates being shown as having frictional engagement with the respective sides of the carrier substantially at the point where it enters the chamber, $b$.

Figures 4, 5, 6, 7:
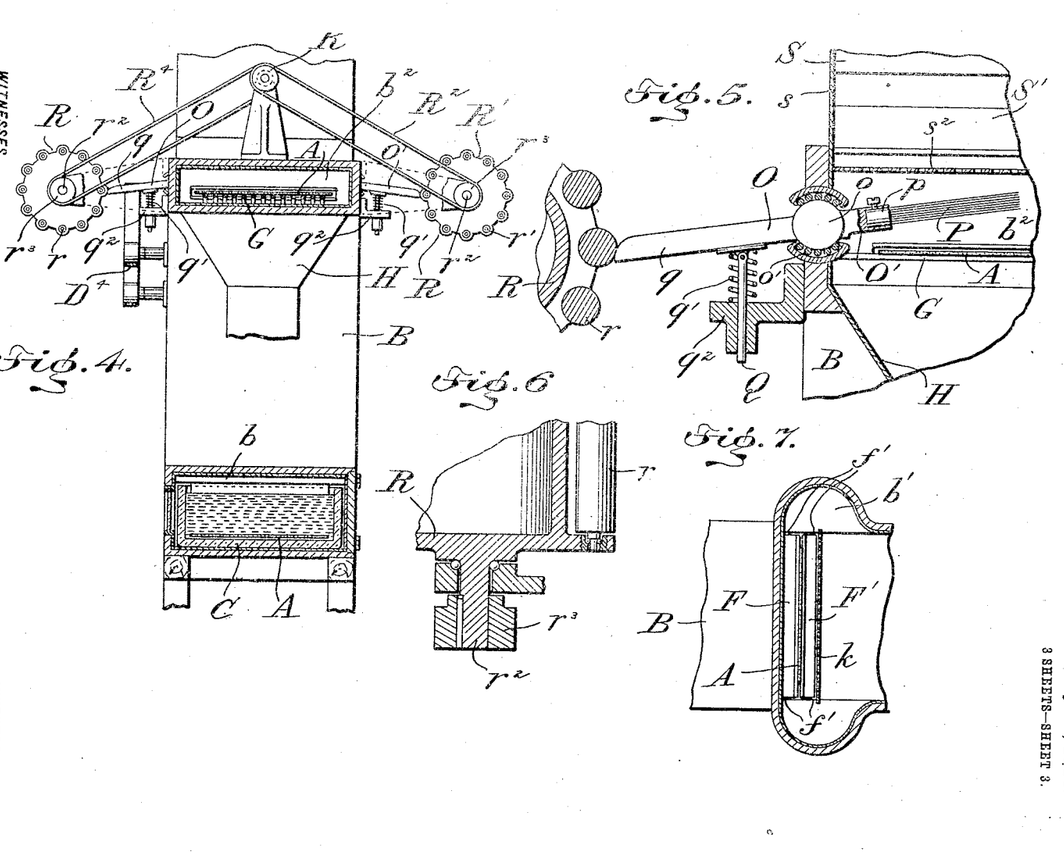
Fig. 4 is a vertical cross section taken in the plane indicated by the irregular dotted line 4—4 of Fig. 1, looking in the direction of the arrow.
Fig. 5 is an enlarged detail view showing one form of a mechanical beater or whip adapted to remove the treated material from the carrier or web.
Fig. 6 is a detail view showing in horizontal section a form of the means for operating the mechanical beaters or whips.
Fig. 7 is a detail horizontal section on the line 7—7 of Fig. 1.

At the point where the outgoing lead of the carrier passes from the chamber, $b$, into the treating chamber, $b'$, I employ a plurality of coöperating wipers, F, F', shown in Figs. 1, 7, and 8 of the drawings. These wipers are hung or pivoted at $f'$ for movement by gravity inwardly toward each other and the endless carrier, and said wipers are shown as having the guards, $f^2$, which are inclined downwardly toward each other and toward the carrier, whereby the excess material which is moved from the carrier by the frictional engagement of the wipers therewith is adapted to be deposited on the guards, $f^2$, and to be returned thereby into the tank, C. It is preferred to employ weighted inclined wipers, substantially as shown in detail in Fig. 8, for the purpose of making said wipers operate by gravity, the wipers having such frictional engagement with the ascending lead of the carrier as will remove the surplus material therefrom, and leave only a thin film of material on the carrier.

Between the treating chamber, $b'$, and the horizontal upper chamber, $b^2$, there is arranged another cut off, $f^3$, adapted to preclude the passage of air from one chamber into the other. The upper chamber, $b^2$, is divided by other cut offs, $f^4$, $f^5$, into a plurality of compartments through which air cannot circulate freely from the chambers, $b'$, $b^3$, into the compartments of the upper chamber, $b^2$.

Figures 2, 3:
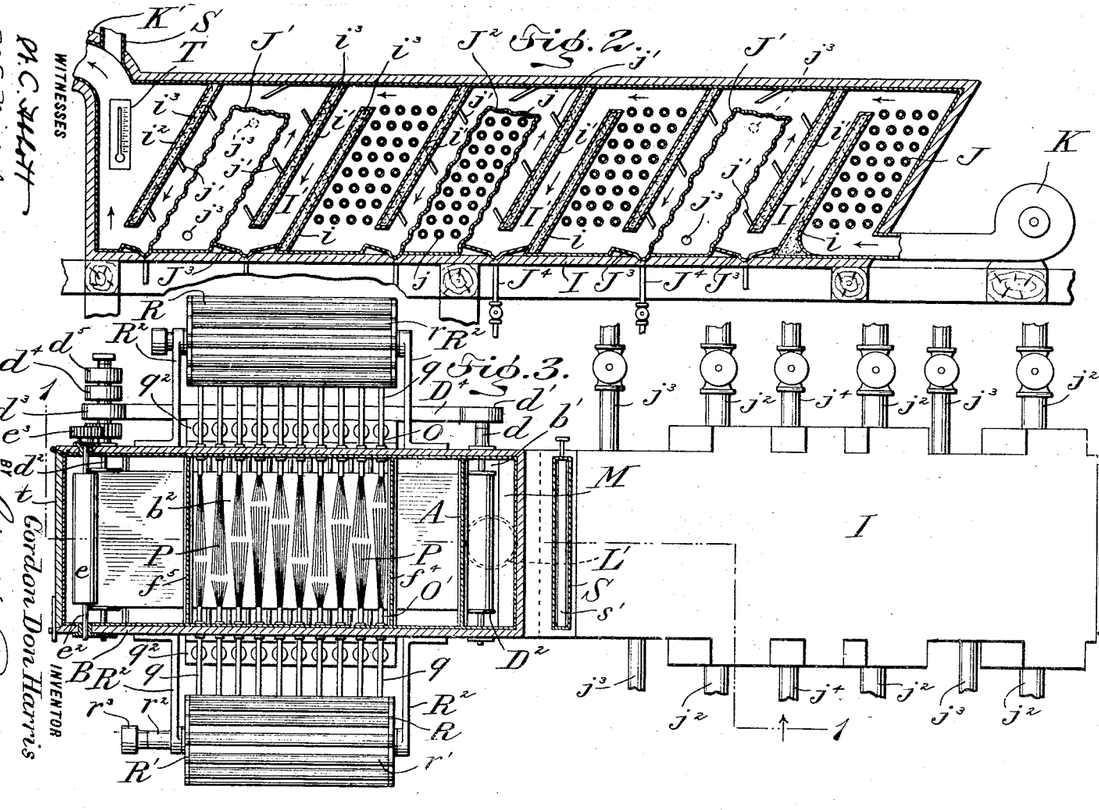
Fig. 2 is a vertical section taken longitudinally through one form of apparatus for dehydrating air.
Fig. 3 is a horizontal section through one of the substantially closed chambers for operating upon the material of an endless carrier or web, the plane of the section being indicated by the dotted line 3—3 in Fig. 1.

The underside of the upper lead forming a part of the endless carrier, A, is adapted to be supported in two of the compartments of the upper chamber, $b^2$, by a plurality of rods, $q$, $q'$, shown in Figs. 1 and 3, said rods extending in the direction of the length of the carrier, and minimizing the frictional engagement thereof with the bottom of the chamber, $b^2$. In the middle compartment of this chamber, $b^2$, there is provided a grid composed of a row of rods, G, which are arranged crosswise to the rods, $q$, $q'$, substantially as shown in Figs. 1 and 3.

H designates a hopper which is arranged directly below the middle compartment of the chamber, $b^2$, and the grid, G, said hopper being adapted for the reception of the treated material, which material is removed mechanically from the horizontal lead of the carrier, A, by the action of suitable whips or beaters to be hereinafter described. The hopper, H, is provided with a tube, $h$, adapted to be extended to any suitable place where it may be desired to discharge the treated material, such as in a closed chamber from which the material is to be put up into packages, or packed into suitable air-tight containers.

In Figs. 1, 2, and 3 of the drawings, I have illustrated one embodiment of means for dehydrating the air which is to be supplied to the treating chamber, $b'$, for the purpose of absorbing the water and moisture which is present in the film on the ascending lead of the carrier, A.

The means shown for dehydrating air contemplates an elongated casing or trunk, I, extending outwardly from the casing, B, on that side thereof which contains the treating chamber, $b'$, but the particular form of the casing, I, and its position with relation to the apparatus are not material. Extending upwardly from the bottom of the casing or trunk, I, is a series of partitions, $i$, while other partitions, $i'$, $i^2$ extend downwardly from the top of said casing or trunk, I. Each partition, $i$, $i'$, $i^2$, is a hollow shell adapted to be packed or charged with suitable non-conducting material, $i^3$. The several partitions are inclined substantially as shown in Fig. 2, and the partitions $i$, $i'$, are parallel and spaced to provide the descending flues, I', whereby two adjacent partitions, $i$, $i'$, constitute what may be designated as a neutral baffle, the latter precluding the passage of heat or cold from heaters and coolers of the dehydrating devices.

The partitions, $i$, $i'$, provide chambers in the casing or trunk, I, and said chambers contain the heaters, J, and the coolers, J'. Said heaters and coolers are arranged alternately in the chambers of the casing or trunk, I, and as shown in Fig. 2, the first chamber contains a coiled pipe heater, J, the second chamber a cooler, J', the third chamber contains another heater, J, the fourth chamber contains a form of cooler, $J^2$, having circulating pipes, $j$, the fifth chamber contains another heater, J, and the sixth chamber contains another cooler similar to the cooler, J', whereby the heaters and coolers alternate one with the other, and, furthermore, an adjacent cooler and heater are separated by a descending flue, I', which is formed between adjacent partitions, $i$, $i'$. The partitions, $i'$ are provided, on their surfaces opposite to the coolers, J', $J^2$, with baffles, $j'$, said baffles being inclined toward said coolers for the purpose of directing the current of air into intimate contact with said coolers. The heaters, J, are shown in the form of pipes extending across the compartments or chambers of the casing, I, and said pipes are supplied with dry superheated steam by valved pipes, $j^2$, but it is evident that the particular form of heater may be modified or changed as desired.

Certain of the coolers, J', are shown as consisting of corrugated shells adapted to be supplied with cold air from valved pipes, $j^3$, and the cooler, $J^2$, is provided with the pipe, $j$, which may be supplied with an ammoniacal cooling agent by valved pipes, $j^4$, but it is evident that the particular form of cooler may be modified as desired.

Air is blown or forced in the casing, I, by a fan, K, and the air is caused to circulate in a circuitous path through the chambers and the flues provided within the casing, I. The air brought into contact with the heaters and the coolers successively with a view to eliminating the moisture contained therein, and the temperature of the heaters and the coolers may be so regulated as to produce a current of dehydrated air at the proper temperature suitable for treating the material contained in the form of a film on the endless carrier, A. The moisture which is condensed by the contact of air with the coolers, J', $J^2$, is collected by the troughs, $J^3$, which are provided below the partitions, $i'$, $i^2$, and from said troughs extend the drain pipes, $J^4$, which are or may be provided with sight tubes formed by sections of glass, whereby the water of condensation may be discharged by opening suitable valves provided in the drain pipes. From the end of the casing or trunk, I, opposite to the fan or blower, K, extends a flue, K', which is connected with the treating chamber, $b'$, preferably at a point above the wipers, F, F', and across the outlet from this flue, K', is a screen, $k$, shown in Fig. 1.

With the upper part of the treating chamber, $b'$, communicates a stack or up-take, L, which forms an escape flue for the air laden with the moisture absorbed from the material under treatment on the endless carrier, A. This stack or up-take may be in the form of a tube or a flaring funnel, and it conducts the air to any suitable place of discharge. In said stack is an exhaust fan, $l$, the latter being operated by any preferred means (not shown), whereby the suction fan operates to quickly remove the moisture laden air from the treating chamber, $b'$. In practice, the air at the upper part of the chamber, $b'$, becomes heavy by the moisture absorbed from the material, and has a tendency to a sluggish circulation in said chamber, but this is overcome by the operation of the suction fan which quickly draws off the heavy moist air from said chamber.

From the foregoing description, taken in connection with the drawings, it will be understood that the carrier, A, takes up or absorbs a small quantity of the material to be treated as said carrier travels through the tank, C, and said material is conveyed by the carrier through the chamber, $b'$, by and between the two series of baffles, M, M'. The baffles, M, are secured to one side of the chamber, $b'$, while the other baffles, M', are fixed on the other side of said chamber, B'. The baffles of one row are in alternate order to the baffles of the other row, and they are in the path of the ascending current of dehydrated air, whereby the baffles direct the air in a zigzag course through the chamber, $b'$, and into intimate contact with the film of material on the endless carrier, A, as it travels through said chamber, $b'$.

The material on the endless carrier is thoroughly dried as it is carried through said chamber, $b'$, and when the material is moved by the carrier, A, into the chamber, $b^2$, it is in a thoroughly desiccated condition. Said material is removed from said carrier in the middle compartment of the chamber, $b^2$, by the action of certain beaters or whips, O, O', the latter operating in said chamber, $b^2$, and between the bars forming the grid, G.

As shown in Fig. 3, I prefer to employ two rows of beaters, O, O', one series of which is pivotally mounted on one side of the endless carrier, whereas the beaters of the other series, O', are pivotally mounted at the opposite side of said carrier. Each beater is provided with journals, $o$, which are mounted in suitable roller bearings, $o'$, as shown in Fig. 5. The beater is provided at one end with a socket, $p$, in which is secured a group of bristles, P, formed, preferably, by metallic wires, although other suitable material may be employed as desired. The beater is provided, furthermore, with an arm, $q$, against which acts a spring, $q'$, each spring being seated on a suitable bracket, $q^2$, and held in place by a guide rod, Q, said guide rod being connected pivotally to the arm, $q$, of the beater, as shown in Fig. 5. The row of beaters, O, have arms, $q$, which are operated on by the rollers, $r$, of an operating cylinder, R, whereas the arms of the beaters, $o'$, are operated upon by rollers, $r'$, of a cylinder, R'. Said cylinders R, R', are carried by shafts, $r^2$, mounted in brackets, $R^2$, and said shafts, $r^2$, are provided with pulleys, $r^3$, which are driven by belts, $R^4$, from pulleys, $R^3$. The two cylinders R, R', are positively rotated so that the successive rollers, $r$, $r'$, will engage rapidly with the arms, $q$, of the beaters for the purpose of imparting rapid vibratory motion to said beaters, the quick action of the beaters being secured by operating them individually by the springs, $q'$. It is preferred to support the beaters by the roller bearings, to mount each cylinder, R, R', in roller bearings as in Fig. 6, and to mount the rollers, $r$, $r'$, of each cylinder in roller bearings, whereby the friction of the working parts is minimized, and said parts are caused to operate easily and freely without the employment of lubricants in or around the apparatus.

The beaters or whips of each row are of variable lengths, some of them being longer than the others, and the long beaters of one row being opposite to, or in alinement with, the short whips of the other row, all as shown in Fig. 3. Such construction and arrangement are advantageous for the reason that the whips are adapted to act at irregular points on the carrier or web, A, for practically its full width, whereby the treated material on said carrier or web may be removed thoroughly and quickly by the rapid acting beaters or whips. Furthermore, the flexible web, A, rests on the bars of the grid, G, in the chamber, $b^2$, and the whips act on said web in the spaces or intervals between said bars, thus causing the web to yield or give slightly between the bars under the impact or blows of said whips, the effect of which is to thoroughly remove the material from the web.

For the purpose of carrying off the loose particles of the treated material which are removed from the upper surface of the web by the action of the beaters, which loose particles are suspended in the air of the chamber, $b^2$, a blast or gentle current of dehydrated air is supplied to the chamber, $b^2$, by means of a pipe, S. One end of said pipe is connected to the flue, K', of the air dehydrating device, I, and at its other end is a hood, $s$, the latter forming the top of the chamber, $b^2$. In the pipe, S, is a valve or damper, $s'$, by which the volume and pressure of air may be regulated, and in the hood or the chamber, $b^2$, is a screen, $s^2$, the function of the latter being to diffuse the air in the chamber and above the web, A. A spreader, S', is above the screen, $s^2$, and opposite to the outlet of the air pipe, S, to direct the current of air toward the end portions of the chamber. Said spreader, S', and the screen, $s^2$, tend to reduce the air pressure to a gentle current and to diffuse the air uniformly in the chamber, $b^2$. The web, A, is not as wide as the chamber, $b^2$, see Fig. 3, and spaces, $s^3$, are thus left between the edges of the web and the walls of the chamber, $b^2$, through which spaces the air is free to circulate and to carry the loose treated material from the chamber, $b^2$, into the hopper, H. Of course, the material on the underside of the web, A, which material is removed by the action of the beaters on said web, falls by gravity into the hopper, H, and thus the treated material is removed from the chamber, $b^2$, as fast as it is freed from the web, A. The air current cannot escape from the chamber, $b^2$, lengthwise of the web or carrier for the reason that the cut-offs, $f^4$, $f^5$, confine the air in said chamber.

The casing or trunk, I, is shown as having a thermometer, T, which should be arranged for viewing it from the outside of the apparatus, thus enabling the operator to ascertain the temperature of the air current at the point where it enters the treating chamber, $b'$.

It is desired to call attention to the fact that in my apparatus provision is made for thoroughly dehydrating the air prior to admitting the same to the treating chamber, and that the filmy material on the traveling carrier or web, A, is treated by such dehydrated air by a process of absorbing the water and moisture therefrom. A large volume of air is blown by the fan, K, into the casing or trunk, I, such air coming in direct contact, alternately, with the hot surfaces of the heaters and the condensing surfaces of the coolers. The air is thus expanded and condensed alternately while caused to circulate in a tortuous course over and around the devices contained in the casing or trunk, I, whereby the moisture is eliminated from the air and the latter is thoroughly sterilized as well as dehydrated before it is admitted to the treating chamber, $b'$. The temperature of the air may be regulated by controlling the temperature of the heaters and the coolers.

The web or carrier, A, is driven at comparatively slow speed through the several chambers of the casing, B, in order that said web may take up the material from the tank, C. Furthermore, the material on the web while passing slowly through the chamber, $b'$, is subjected to the action of a large volume of sterilized and dehydrated air, the circulation of which air in said chamber is augmented by the operation of the suction fan, $l$, for the purpose of rapidly carrying off the moisture laden air from the chamber, $b'$, the air in the chamber being brought into direct and intimate contact with the films of material on the web by the baffles, whereby the material is thoroughly desiccated. Furthermore, the slowly moving carrier or web is subjected to the action of a large number of rapidly operating beaters, O, O', in the chamber, $b^2$, for mechanically removing the material from the web in said chamber, $b^2$, and at the same time, the material is carried off by a gentle current of dehydrated air, so that the desiccated material is not exposed to the surrounding atmospheric air and is conveyed in a closed conduit to receptacles, from which the material may be taken and packed under such circumstances that it cannot be contaminated.

The entire apparatus is so constructed and arranged that the material may from beginning to the end of its treatment be handled in a sanitary manner. In this connection it is desired to say that all lubricants are omitted in order that odors therefrom may not come in contact with the material under treatment, such as milk, and, further, air is prevented from passing one chamber to the other, to minimize the tendency of contamination. Furthermore, the desiccated material on the web in the chamber, $b'$, and one compartment of the upper chamber, $b^2$, is moved slowly and with care, and the web is supported by the skeleton guide member, $D^2$, and over the bars, $g$, so as not to dislodge the desiccated material from the web, A.

The carrier, A, is shown as an endless traveling web adapted to pass through the successive chambers and operate to continuously treat the material. Said carrier may be composed of a flexible web of absorbent material, such as a textile fabric, when treating certain substances, but for other substances I may use a web of metallic gauze.

When it is desired to install a web, A, in the apparatus, or to replace one web by another, the apparatus may be equipped with the rollers, T', $T^2$, shown in Fig. 1. The chamber, $b^3$, is equipped with a door, $t$, and in the chamber are the rollers, T', $T^2$, on one of which the web to be removed may be wound. The other roller is adapted to contain a fresh web, and when the latter is to be placed in the several chambers of the apparatus, one end of said fresh web is attached to one end of the web to be withdrawn. The connected webs are now operated so as to draw the fresh web into the chambers, $b$, $b'$, $b^2$, $b^3$, while the web to be replaced is coiled on one of the rollers, and thereafter moved from the machine.

Suitable means are provided for driving the roller cylinders, R, R'. As shown, the belts, $R^4$, are fitted on the pulleys of the cylinder shafts, and said belts are operated by pulleys, $R^3$, whereby the cylinders are adapted to be driven at equal speeds for the operation of the two rows of heaters or whips, O, O'.

In the practical operation of my apparatus it is found that a certain volume of dehydrated air blown into the treating chamber has the effect of desiccating the material, but the best results are obtained by introducing two or three times the volume of such dehydrated air for the reason that the water and moisture are absorbed more quickly from the material and the latter is dried more thoroughly by an excess of dehydrated air in the treating chamber.

The air blown by the fan into the trunk or casing, I, passes upwardly and downwardly over the heaters and the coolers alternately, and through the flues of the neutral baffles, whereby the air is expanded by the heaters and condensed by the coolers for the purpose of thoroughly eliminating the moisture therefrom. By causing the air to circulate in a tortuous course through the trunk or casing, I, the force of the current is reduced and the air is supplied in a comparatively gentle current to the treating chamber. This makes it advisable to employ the suction fan, $l$, for exhausting the moisture laden air from the upper part of the treating chamber.

The main purpose of the heaters, J, and the coolers, $J'$, $J^2$, is to dehydrate the air and raise its temperature, but the final cooler, $J'$, of the series employed is to regulate the temperature of the air so that it will be in the best condition for the performance of its work just as it is admitted to the treating chamber.

Although I have described my invention as especially adapted for treating liquid and semi-liquid food substances, it is to be understood that the apparatus may be used for treating other liquid or semi-liquid substances, such as blood.

Having thus fully described the invention, what I claim as new, and desire to secure by Letters Patent is:

1. In a dehydrating apparatus, a substantially closed chamber, a receptacle in said chamber for containing the liquid material to be treated, a flexible web adapted to pass through liquid material in said receptacle, means coöperating with the web for producing a thin film of the liquid material on the web, means for dehydrating air, and means for subjecting the material on a part of said web to the action of such dehydrated air, whereby said liquid material is distributed in a thin film on said web and exposed while in a filmy condition to contact with dehydrated air.

2. In a dehydrating apparatus, a substantially closed chamber, a receptacle in said chamber for containing the liquid material to be treated, a fabric web adapted to pass through said material and to absorb the same, whereby a thin film of material is distributed over the surface of said web, means for alternately heating and cooling air, whereby said air is dehydrated, and means for subjecting the material while in a filmy condition and on a part of the web to the action of air so dehydrated, whereby the water present in the material on a part of the web is absorbed by such dehydrated air.

3. In a dehydrating apparatus, a substantially closed chamber, means for containing the liquid material to be treated, a flexible web adapted to pass through the material, means for dehydrating the material taken up by the web, and means for beating said web and thereby removing the dried material from the web.

4. In a dehydrating apparatus, a substantially closed chamber, means for containing the liquid material to be treated, a flexible web adapted to pass through the material, means for dehydrating the material taken up by the web, means for removing the dried material from the web, and a hopper in communication with said chamber and into which hopper a current of dehydrated air is adapted to be introduced for carrying off the product after its removal from the web.

5. In a dehydrating apparatus, an absorbent web adapted to carry the liquid material to be treated, a substantially closed chamber in which said web is adapted to travel, means for dehydrating air and supplying it to said chamber, and means for directing the dehydrated air in a tortuous course through the chamber and along part of the web therein.

6. In a dehydrating apparatus, a substantially closed desiccating chamber, two groups of baffles therein, the baffles of one group being in alternate order to those of the other group, a web adapted to carry the material to be treated between said groups of baffles, and means for supplying air to said chamber, whereby the air is directed by the baffles toward and against the material on the respective surfaces of said web.

7. In a dehydrating apparatus, a tank for supplying the liquid material to be treated, a substantially closed desiccating chamber communicating with said tank, a web adapted to travel in the tank and in said chamber, and wipers engaging frictionally with the web and arranged at the point of communication between the desiccating chamber and the tank to form a substantially air tight connection between said tank and the desiccating chamber.

8. In a dehydrating apparatus, a traveling web, means for desiccating material supported on the web, and beaters operating on the web subsequent to the desiccation of the material thereon, whereby the dried material may be removed from the web.

9. In a dehydrating apparatus, a substantially closed chamber, a carrier for the material to be treated, means whereby the material on the carrier is desiccated, beaters adapted to loosen the material on said carrier, and means for operating said beaters.

10. In a dehydrating apparatus, a substantially closed chamber, a carrier web for the material, means whereby the material on the carrier web is desiccated, two rows of beaters mounted at the respective edges of the web, and adapted to operate thereon for substantially its width, and means for operating said beaters.

11. In a dehydrating apparatus, a substantially closed chamber, a carrier for the material, means whereby the material on the carrier is desiccated, beaters of different lengths adapted to operate on said carrier for removing the treated material therefrom, and means for operating said beaters.

12. In a dehydrating apparatus, a substantially closed chamber, a carrier for the material, means whereby the material on the carrier is desiccated, two rows of beaters mounted at the respective edges of the carrier, each row comprising beaters of different lengths and said rows operating on the carrier for substantially its width, and means for operating said beaters.

13. In a dehydrating apparatus, a substantially closed chamber, a carrier for the material, means whereby the material on the carrier is desiccated, beaters each pivoted intermediate the length thereof and provided with a whip and with a shank, and a rotary operating member having means for engaging with the shanks of said beaters for imparting rapid vibration thereto.

14. In a dehydrating apparatus, a substantially closed chamber, a carrier for the treated material, means whereby the material on the carrier is desiccated, spring-actuated pivoted beaters or whips adapted to operate on the carrier, and an operating member for imparting rapid vibratory motion to said beaters or whips.

15. In a dehydrating apparatus, a substantially closed chamber, a flexible web adapted to carry the treated material, means whereby the material on said flexible web is desiccated, a grid over which the web is adapted to travel, and whips or beaters operating on said web subsequent to the desiccation of the material thereon, whereby said whips or beaters remove the material from said web.

16. In a dehydrating apparatus, a substantially closed desiccating chamber, a carrier operating in said chamber, means for mechanically removing the treated material from said carrier, a hopper communicating with said chamber for receiving the dehydrated material removed from the carrier, and means for admitting a current of air to said chamber whereby the loose particles of treated material are carried into said hopper.

17. In a dehydrating apparatus, a substantially closed chamber, a hopper for the treated material, a flexible web operating in said chamber, means whereby the material on said flexible web is desiccated, a grid over which the web is adapted to travel, beaters operating on the web for removing the treated material therefrom, and means for admitting a current of air to said chamber.

18. In a dehydrating apparatus, a tank for containing the liquid material to be treated, a substantially air tight desiccating chamber communicating with said liquid tank, a stack or uptake leading from said desiccating chamber, a web adapted to travel in the tank and the desiccating chamber, means for supplying dehydrated air to the desiccating chamber, baffles in the desiccating chamber, and a suction fan in the stack or uptake and operating to exhaust the moist air from the desiccating chamber.

19. In a dehydrating apparatus, a plurality of chambers, a traveling web adapted to move through said chambers, means for securing substantially air tight connections between the several chambers and the web at the points where said web enters or leaves the chambers, means in one of said chambers for supplying liquid material to the web, means for admitting dehydrated air to another of said chambers, and means in a further one of said chambers for beating the web, whereby the dehydrating material is removed from said web.

20. In a dehydrating apparatus, a plurality of substantially air tight chambers, a web adapted to travel through said chambers, means in one chamber for supplying material to be treated to said web, means for admitting dehydrated air to the material in the web during its passage through another of said chambers, means in another chamber for removing treated material from the web, and means independent of the dehydrated air admission means for admitting a current of air to the last mentioned chamber.

21. In a dehydrating apparatus, a tank for the liquid material to be treated, a desiccating chamber in communication with the tank, a beating chamber in communication with the desiccating chamber, a web adapted to travel through the tank and the aforesaid chambers, means for desiccating the material on the web as it travels through the desiccating chamber, and means for beating the web as it passes through the beating chamber and subsequent to the operation of desiccating the material on said web, whereby the dried material is removed from said web.

22. In a dehydrating apparatus, a desiccating chamber, a beating chamber in communication with said desiccating chamber, a web adapted to travel in said chambers, means for supplying material to be treated to the web, means for supplying a dehydrating agent to the desiccating chamber, and beaters in said beating chamber for operating on the web therein for removing the dried material from said web.

23. In a dehydrating apparatus, a desiccating chamber, a beating chamber in communication with said desiccating chamber, a web adapted to travel in said chambers, means for supplying material to be treated to the web, means for supplying a dehydrating agent to the desiccating chamber, means for exhausting moist air from the outlet end of the desiccating chamber, whereby the moist air is precluded from entering the beating chamber, and beaters operating on the web for dislodging dehydrated material therefrom.

24. In a dehydrating apparatus, a desiccating chamber, a beating chamber in communication with said desiccating chamber, a web adapted to travel in said chambers, means for supplying material to be treated to the web, means for supplying a dehydrating agent to the desiccating chamber, beaters operating on said web and within the beating chamber for dislodging dehydrated material therefrom, and means independent of the aforesaid supplying means to the desiccating chamber for feeding a dehydrating agent to the beating chamber.

In testimony whereof I have signed my name to this specification in the presence of two subscribing witnesses.

GORDON DON HARRIS

Witnesses:
JAS. H. GRIFFIN,
H. I. BERNHARD.